(12) United States Patent
Son et al.

(10) Patent No.: US 10,804,578 B2
(45) Date of Patent: Oct. 13, 2020

(54) BATTERY MODULE, BATTERY PACK AND VEHICLE HAVING SAME

(71) Applicant: LG Chem, Ltd., Seoul (KR)

(72) Inventors: Sang-Il Son, Daejeon (KR); Ha-Neul Yoo, Daejeon (KR); Yun-Ki Choi, Daejeon (KR); Jong-Soo Ha, Daejeon (KR)

(73) Assignee: LG Chem, Ltd., Seoul (KR)

( * ) Notice: Subject to any disclaimer, the term of this patent is extended or adjusted under 35 U.S.C. 154(b) by 100 days.

(21) Appl. No.: 15/770,697

(22) PCT Filed: Jan. 16, 2017

(86) PCT No.: PCT/KR2017/000531
§ 371 (c)(1),
(2) Date: Apr. 24, 2018

(87) PCT Pub. No.: WO2017/146379
PCT Pub. Date: Aug. 31, 2017

(65) Prior Publication Data
US 2019/0067760 A1  Feb. 28, 2019

(30) Foreign Application Priority Data
Feb. 22, 2016 (KR) ......................... 10-2016-0020741

(51) Int. Cl.
*H01M 10/613* (2014.01)
*H01M 10/653* (2014.01)
(Continued)

(52) U.S. Cl.
CPC .......... *H01M 10/613* (2015.04); *B60L 50/64* (2019.02); *B60L 58/26* (2019.02); *H01M 2/1077* (2013.01);
(Continued)

(58) Field of Classification Search
CPC ............ H01M 10/613; H01M 10/653; H01M 10/6567; H01M 10/625; H01M 10/6551; B60L 11/1874; B60L 11/1879
See application file for complete search history.

(56) References Cited

U.S. PATENT DOCUMENTS

| 2012/0040226 A1 | 2/2012 | Kim et al. |
| 2014/0234691 A1 | 8/2014 | Lee et al. |
| 2014/0356684 A1 | 12/2014 | Lim |

FOREIGN PATENT DOCUMENTS

| CN | 102376992 A | 3/2012 |
| CN | 102780052 A | 11/2012 |

(Continued)

OTHER PUBLICATIONS

International Search Report for Application No. PCT/KR2017/000531, dated Apr. 18, 2017 (5 Pages).

(Continued)

*Primary Examiner* — Osei K Amponsah
(74) *Attorney, Agent, or Firm* — Morgan, Lewis & Bockius LLP (57) ABSTRACT

The present disclosure relates to a battery module, and a battery pack and a vehicle including the same. A battery module according to an embodiment of the present disclosure includes a cartridge including an accommodation space therein; a plurality of battery cells placed in the accommodation space; and a cooling unit configured to cool the battery cells, wherein the cooling unit includes: a cooling fin making surface contact with sides of the battery cells; a cooling plate placed below the cooling fin; and a connection member placed between the cooling fin and the cooling plate and transferring heat from the cooling fin to the cooling plate.

11 Claims, 8 Drawing Sheets

(51) Int. Cl.
  *H01M 10/6551* (2014.01)
  *H01M 10/6554* (2014.01)
  *H01M 10/625* (2014.01)
  *H01M 10/6567* (2014.01)
  *H01M 10/647* (2014.01)
  *H01M 10/6561* (2014.01)
  *H01M 10/6566* (2014.01)
  *H01M 2/10* (2006.01)
  *H01M 10/6555* (2014.01)
  *B60L 58/26* (2019.01)
  *B60L 50/64* (2019.01)
  *B60K 6/28* (2007.10)

(52) U.S. Cl.
  CPC ....... *H01M 10/625* (2015.04); *H01M 10/647* (2015.04); *H01M 10/653* (2015.04); *H01M 10/6551* (2015.04); *H01M 10/6554* (2015.04); *H01M 10/6555* (2015.04); *H01M 10/6561* (2015.04); *H01M 10/6566* (2015.04); *H01M 10/6567* (2015.04); *B60K 6/28* (2013.01); *B60L 2240/545* (2013.01); *B60Y 2200/91* (2013.01); *B60Y 2200/92* (2013.01); *B60Y 2400/112* (2013.01); *H01M 2220/20* (2013.01); *Y02T 10/7005* (2013.01)

(56) References Cited

FOREIGN PATENT DOCUMENTS

| | | |
|---|---|---|
| EP | 2 405 528 A1 | 1/2012 |
| EP | 3 035 434 A1 | 6/2016 |
| JP | 2010-126685 A | 6/2010 |
| JP | 2012-204129 A | 10/2012 |
| JP | 2013-125617 A | 6/2013 |
| JP | 2014-534597 A | 12/2014 |
| KR | 10-2013-0132459 A | 12/2013 |
| KR | 10-2014-0039350 A | 4/2014 |
| KR | 10-20140039350 * 4/2014 | ............ H01M 10/60 |
| KR | 10-2014-0140679 A | 12/2014 |
| KR | 10-2016-0016498 A | 2/2016 |
| WO | 2012/013789 A1 | 2/2012 |
| WO | 2012/055044 A1 | 5/2012 |

OTHER PUBLICATIONS

First Office Action and Search Report dated Jul. 23, 2020, issued in corresponding Chinese Patent Application No. 201780003836.9.

* cited by examiner

BATTERY MODULE, BATTERY PACK AND VEHICLE HAVING SAME

TECHNICAL FIELD

The present disclosure relates to a battery module including a battery cell, and a battery pack and a vehicle including the same, and more particularly, to a battery module capable of cooling a battery cell, and a battery pack and a vehicle including the same.

The present application claims priority under 35 U.S.C. § 119 to Korean Patent Application No. 10-2016-0020741 filed on Feb. 22, 2016 in the Republic of Korea, and under 35 U.S.C. § 365 to PCT/KR2017/000531 filed on Jan. 16, 2017, the disclosures of which are incorporated herein by reference.

BACKGROUND

Secondary batteries are highly applicable to various product groups and have electrical characteristics with high energy density. Such secondary batteries are applied not only to portable electronic devices but also to electric or hybrid vehicles driven by electrical driving sources, power storage devices, etc.

The use of secondary batteries can markedly reduce the consumption of fossil fuels, and in addition to this primary merit, secondary batteries do not generate any byproducts caused by energy consumption, thereby receiving much attention as a new energy source for improving environment friendliness and energy efficiency.

Battery packs applied to electric vehicles or the like have a structure in which a plurality of battery modules including a plurality of battery cells are connected to each other for high output power. In addition, each battery cell is an electrode assembly that can be repeatedly charged and discharged by electrochemical reaction between components including positive and negative electrode collectors, a separator, an active material, an electrolyte, etc.

In recent years, along with the increasing need for a large-capacity structure applicable as an energy storage device as well, there is increasing demand for battery packs having a multi-module structure formed by a plurality of battery modules in which a plurality of secondary batteries are connected in series and/or parallel.

Since battery packs having a multi-module structure are manufactured in such a manner that a plurality of secondary batteries are densely packed in a narrow space, it is important to easily discharge heat generated from each secondary battery. During the charging or discharging operation of a secondary cell battery, heat is generated as a result of electrochemical reaction. If heat is not efficiently dissipated from a battery module during charging and discharging operations, heat may accumulate. In addition, the battery module may deteriorate and in some cases may catch on fire or explode.

Therefore, a high-power, high-capacity battery module and a battery pack including the battery module must have a cooling device so as to cool battery cells included therein.

In general, there are two typical types of cooling devices: an air cooling type and a water cooling type. Due to problems such as a short circuit or making a secondary battery watertight, the air cooling type is more widely used than the water cooling type.

The power that can be produced by a single secondary battery cell is not so high, and thus in general a necessary number of battery cells are stacked and packaged in a module case of a commercial battery module. In addition, a plurality of cooling fins corresponding to the area of the battery cells are inserted as heat-dissipating members between the battery cells so as to dissipate heat generated while electricity is generated from each battery cell and thus to maintain a proper secondary battery temperature. The cooling fins absorbing heat from each battery cell are connected to a single cooling plate and transfer heat to the cooling plate. The cooling plate transfers heat received from the cooling fins to a heat sink, and the heat sink is cooled by cooling water or cooling air.

However, it is difficult to fully bring contact portions of the cooling fins and the cooling plate into tight contact with each other as a whole because of their shapes, and thus the heat conduction efficiency thereof decreases. If the efficiency of heat conduction between the cooling fins and the cooling plate decreases, there arise a problem in that the battery cells are not effectively cooled.

SUMMARY

The present disclosure is to provide a battery module capable of improving the cooling efficiency of a battery cell, and a battery pack and a vehicle including the same.

In addition, the present disclosure is to provide a battery module capable of maintaining a uniform temperature across regions of a battery cell when cooling the battery cell, and a battery pack and a vehicle including the same.

The present disclosure is not limited thereto, and other objects not mentioned above may be clearly understood by those of ordinary skill in the art from the following description.

The present disclosure provides a battery module including a plurality of battery cells.

According to an embodiment of the present disclosure, a battery module may include: a cartridge including an accommodation space therein; a plurality of battery cells placed in the accommodation space; and a cooling unit configured to cool the battery cells, wherein the cooling unit may include: a cooling fin making surface contact with sides of the battery cells; a cooling plate placed below the cooling fin; and a connection member placed between the cooling fin and the cooling plate and transferring heat from the cooling fin to the cooling plate.

According to an embodiment of the present disclosure, the connection member may include a thermal conductive sheet.

According to an embodiment of the present disclosure, the cooling fin may include a bent fin portion that is bent in a direction toward the battery cells, the cooling plate may include a bent plate portion located below the bent fin portion, and the connection member may include a bent connection portion located between the bent fin portion and the bent plate portion.

According to an embodiment of the present disclosure, a surface of the bent fin portion may be in contact with the cartridge.

According to an embodiment of the present disclosure, the bent fin portion, the bent plate portion, and the bent connection portion may have shapes corresponding to each other.

According to an embodiment of the present disclosure, a portion of the cartridge making contact with the bent fin portion may have a shape corresponding to the bent fin portion.

According to an embodiment of the present disclosure, the connection member may be coupled to the cooling fin and the cooling plate by a thermal fusing method.

According to an embodiment of the present disclosure, the battery module may further include a heat exchange unit placed below the cooling plate and capable of exchanging heat with the cooling plate.

According to an embodiment of the present disclosure, the heat exchange unit may include: a heat exchange chamber configured to exchange heat with the cooling plate by using a cooling fluid introduced from outside of the heat exchange chamber; a supply pipe configured to supply the cooling fluid to the heat exchange chamber; and a discharge pipe configured to discharge the cooling fluid outward from the heat exchange chamber.

The present disclosure may provide a battery pack including the battery module.

The present disclosure may provide a vehicle including the battery pack.

According to an embodiment of the present disclosure, the cooling efficiency of the battery cells may be improved by bonding the cooling fin and the cooling plate to each other using the thermal conductive sheet.

In addition, according to an embodiment of the present disclosure, the efficiency of heat conduction from the cooling fin to the cooling plate may be improved by bring the cooling fin into contact with the cooling plate using the thermal conductive sheet.

The effects of the present disclosure are not limited to the above-mentioned effects, and other effects not mentioned above may be clearly understood by those of ordinary skill in the art from the present specification and the accompanying drawings.

DETAILED DESCRIPTION

Hereinafter, embodiments of the present disclosure will be described in detail with reference to the accompanying drawings. The embodiments of the present disclosure may be modified in various forms, and the scope of the present disclosure should not be construed as being limited to the embodiments described below. These embodiments are provided to more fully explain the present disclosure to those of ordinary skill in the art. Thus, in the drawings, the shapes of some elements may be exaggerated for clearer explanation and emphasis. In addition, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Figure 1:
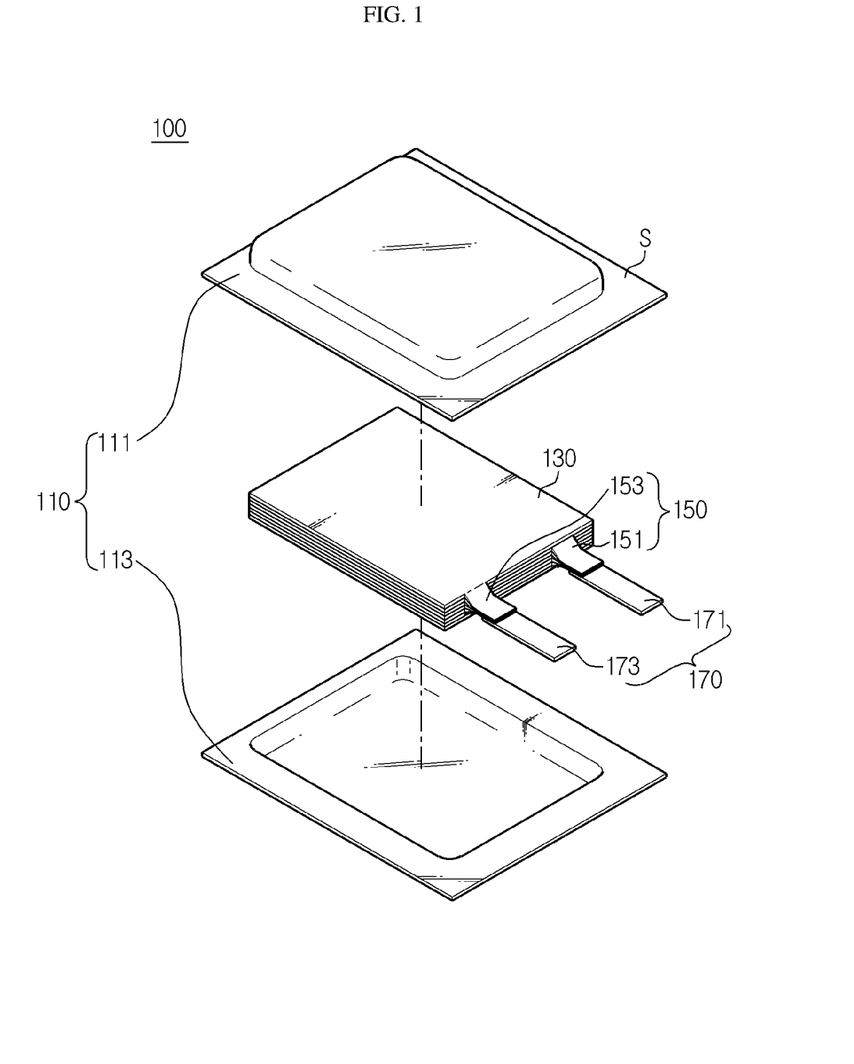
FIG. 1 is an exploded perspective view illustrating a configuration of a battery cell according to an embodiment of the present disclosure.
Figure 2:
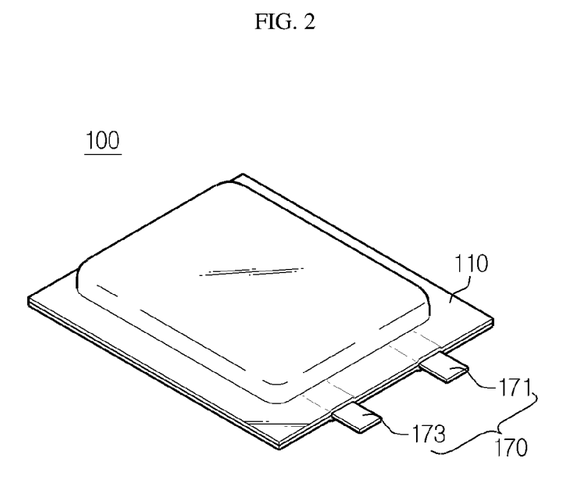
FIG. 2 is a perspective view illustrating the battery cell according to an embodiment of the present disclosure.

Before describing a battery module 10 of the present disclosure, a plurality of battery cells 100 included in the battery module 10 will be described first. In an embodiment of the present disclosure, a pouch-type battery cell 100 will be described as an example of secondary battery cells. FIG. 1 is an exploded perspective view illustrating a configuration of a battery cell according to an embodiment of the present disclosure, and FIG. 2 is a perspective view illustrating the battery cell according to an embodiment of the present disclosure. Referring to FIGS. 1 and 2, the battery cell includes a pouch case 110, an electrode assembly 130, an electrode tab 150, and an electrode lead 170.

The pouch case 110 has an inner space. The electrode assembly 130 and an electrolyte to be described later are placed inside the pouch case 110. A central region of the pouch case 110 protrudes in upward and downward directions. The pouch case 110 includes an upper case 111 and a lower case 113.

The upper case 111 and the lower case 113 are combined with each other to form the inner space. A central region of the upper case 111 has a concave shape protruding upward. The lower case 113 is placed under the upper case 111. A central region of the lower case 113 has a concave shape protruding downward. Alternatively, the inner space of the pouch case 110 may be formed in only one of the upper case 111 and the lower case 113.

The upper case 111 and the lower case 113 have sealing portions S, respectively. The sealing portion S of the upper case 111 and the sealing portion S of the lower case 113 may be provided in a mutually-facing manner. The sealing portion S of the upper case 111 and the sealing portion S of the lower case 113 may be bonded to each other by thermally fusing inner adhesive layers provided on inner sides of the sealing portions S to each other. The inner space may be sealed by bonding the sealing portions S to each other.

The electrolyte and the electrode assembly 130 are accommodated in the inner space of the pouch case 110. The pouch case 110 may include an outer insulating layer, a metal layer, and an inner adhesive layer. The outer insulating layer may prevent permeation of external moisture, gas, or the like. The metal layer may improve the mechanical strength of the pouch case 110. The metal layer may be formed of aluminum. Alternatively, the metal layer may be formed of any one selected from an alloy of iron; carbon; chromium; an alloy of manganese; iron; nickel; an alloy of nickel; aluminum; and an equivalent thereof. If the metal layer is formed of a material containing iron, mechanical strength may be increased. If the metal layer is formed of an aluminum material, ductility may be high. As a preferred embodiment of the metal layer, an aluminum layer may be provided. The outer insulating layer and the inner adhesive layer may be formed of polymer materials.

The electrode assembly 130 includes a positive electrode plate, a negative electrode plate, and a separator. The electrode assembly 130 may be provided in such a manner that at least one positive electrode plate and at least one negative electrode plate are arranged with a separator being disposed therebetween. The electrode assembly 130 may be provided in such a manner that a plurality of positive electrode plates and a plurality of negative electrode plates are alternately stacked. Alternatively, the electrode assembly 130 may be provided in such a manner that one positive electrode plate and one negative electrode plate are wound.

Each of the electrode plates of the electrode assembly 130 includes a current collector and an active material slurry applied to one or both sides of the current collector. The active material slurry may be formed by agitating a granular active material, an auxiliary conductor, and a binder in a state in which a solvent such as a plasticizer is added thereto. Each of the electrode plates may include a non-coated portion that is a region to which the active material slurry is not applied. The electrode tab 150 corresponding to each electrode plate may be formed on the non-coated portion.

The electrode tab 150 extends from the electrode assembly 130 in a protruding shape. The electrode tab 150 includes a positive electrode tab 151 and a negative electrode tab 153. The positive electrode tab 151 may extend from the non-coated portion of the positive electrode plate, and the negative electrode tab 153 may extend from the non-coated portion of the negative electrode plate.

One positive electrode tab 151 and one negative electrode tab 153 may be provided on the battery cell 100. Alternatively, a plurality of positive electrode tabs 151 and a plurality of negative electrode tabs 153 may be provided. For example, if the electrode assembly 130 of the battery cell 100 includes only one positive electrode plate and one negative electrode plate, one positive electrode tab 151 and one negative electrode tab 153 may be provided. Alternatively, a plurality of positive electrode tabs 151 and a plurality of negative electrode tabs 153 may be provided. If the electrode assembly 130 includes a plurality of positive electrode plates and a plurality of negative electrode plates, a plurality of positive electrode tabs 151 and a plurality of negative electrode tabs 153 may also be included in the electrode assembly 130 such that each electrode plate may be provided with an electrode tab 150.

The electrode lead 170 may electrically connect the battery cell 100 to other external devices. The electrode lead 170 may include a positive electrode lead 171 and a negative electrode lead 173. The electrode lead 170 may extend from the inside to the outside of the pouch case 110. A portion of the electrode lead 170 may be interposed between the sealing portions S. The electrode lead 170 is connected to the electrode tab 150.

Figure 3:
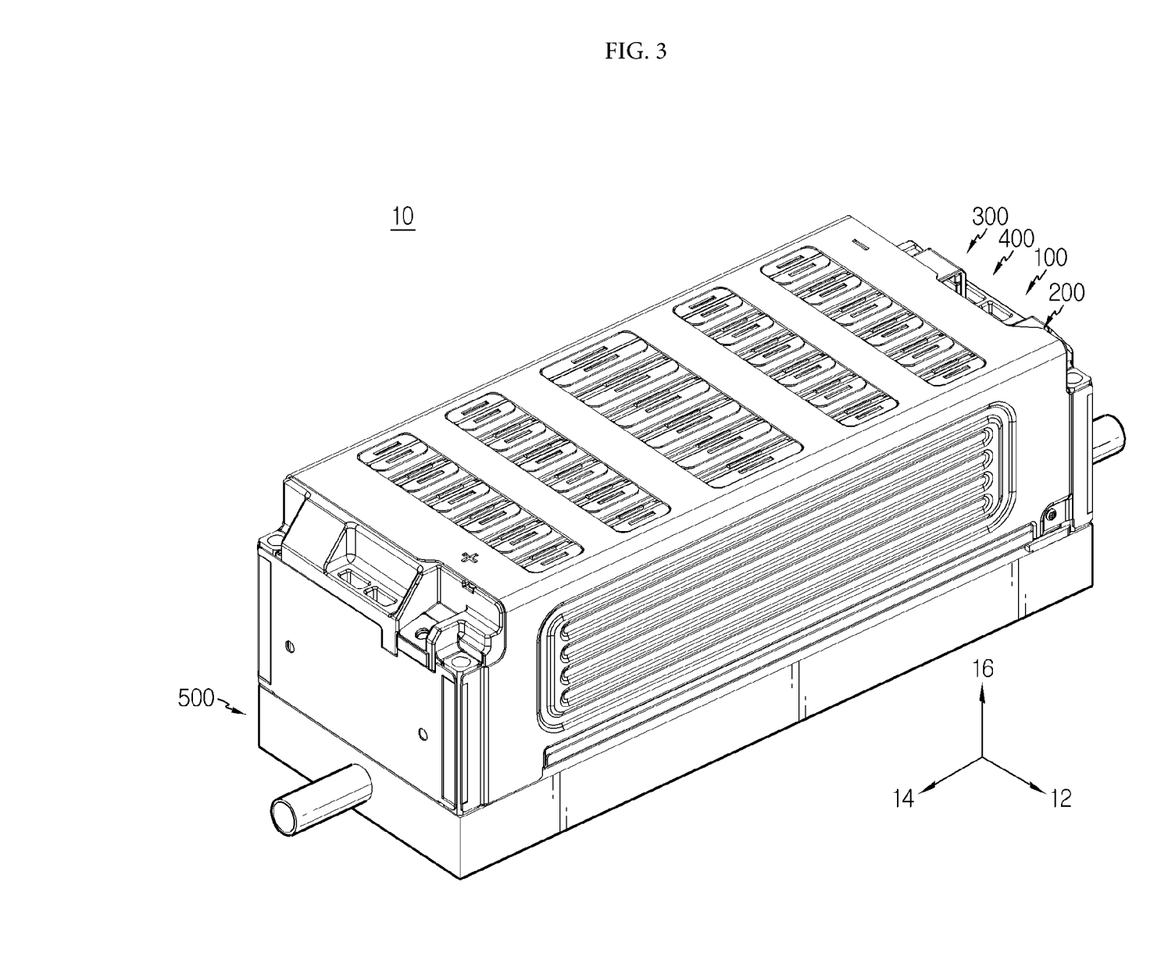
FIG. 3 is a perspective view illustrating a battery module according to an embodiment of the present disclosure.
Figure 4:
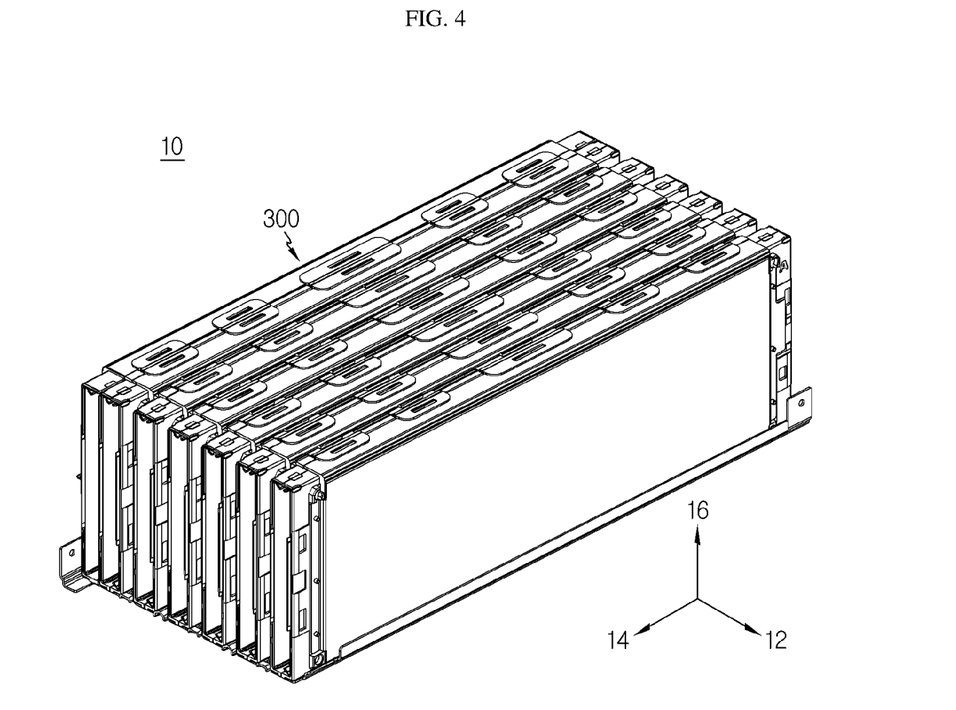
FIG. 4 is a perspective view illustrating a state in which a plurality of cartridges illustrated in FIG. 3 are stacked.
Figure 5:
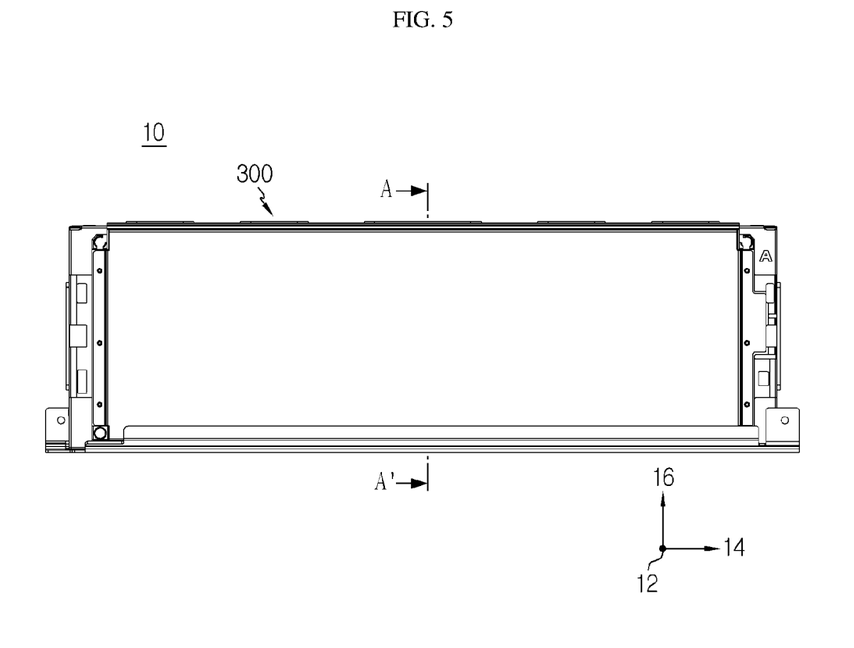
FIG. 5 is a front view of FIG. 3.

Hereinafter, a battery module 10 will be described according to an embodiment of the present disclosure. FIG. 3 is a perspective view illustrating a battery module according to an embodiment of the present disclosure, FIG. 4 is a perspective view illustrating a stacked state of a plurality of cartridges illustrated FIG. 3, and FIG. 5 is a front view of FIG. 3. Referring to FIGS. 3 to 5, the battery module 10 includes a plurality of battery cells 100. The battery module 10 includes the battery cells 100, a case 200, the cartridges 300, a cooling unit 400, and a heat exchange unit 500.

The battery module 10 is formed by stacking the cartridges 300 in which the plurality of battery cells 100 are accommodated. Hereinafter, a direction in which the plurality of battery cells 100 are stacked is referred to as a first direction 12, a direction perpendicular to the first direction 12 when viewed from above is referred to as a second direction 14, and a direction perpendicular to both the first direction 12 and the second direction 14 is referred to as a third direction 16.

The installed battery cells 100 are the same as the above-described battery cell 100. The case 200 has an inner space. The plurality of cartridges 300 are placed in the inner space of the case 200. The case 200 has a substantially rectangular parallelepiped shape. The case 200 may protect the battery cells 100 disposed therein from external impact.

Each of the cartridges 300 has an accommodation space therein. A plurality of battery cells 100 are placed in the accommodation space. In the embodiment of the present disclosure, two battery cells 100 may be accommodated in the accommodation space. Alternatively, three or more battery cells 100 may be accommodated in the accommodation space.

The cartridges 300 may have a rectangular shape when viewed in the first direction 12. The cartridges 300 may be provided in the form of a frame having a space therein. The cartridges 300 may support the battery cells 100 on both sides in the second direction 14.

A plurality of cartridges 300 may be provided. The plurality of cartridges 300 are stacked in the first direction 12. The plurality of cartridges 300 may be placed in the inner space of the case 200.

Figure 6:
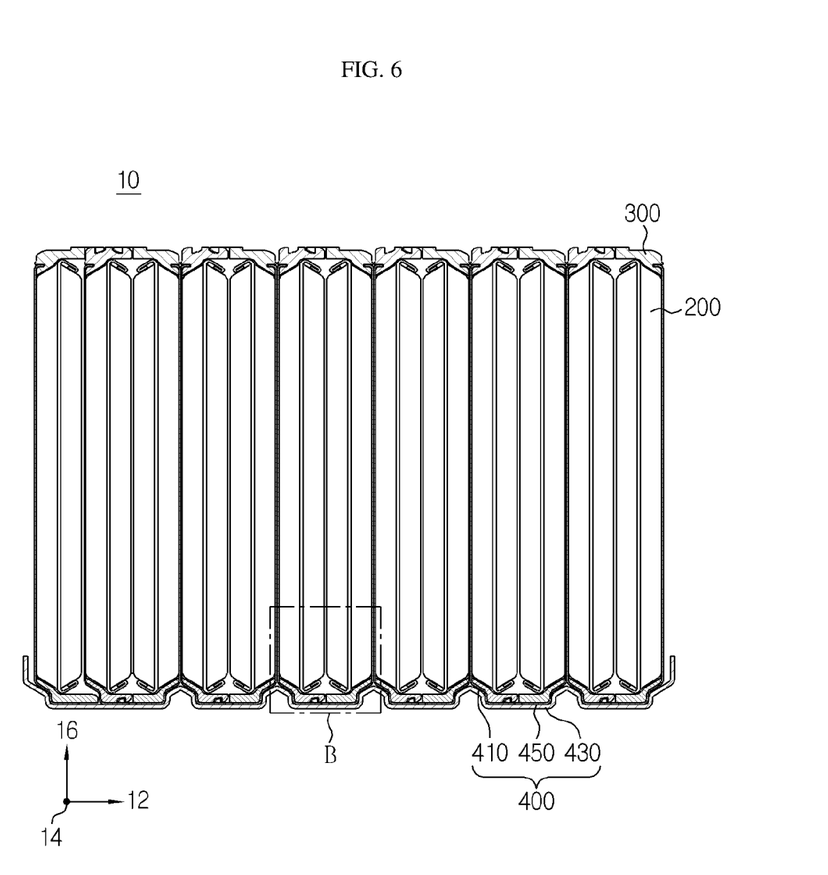
FIG. 6 is a cross-sectional view illustrating the battery module according to an embodiment of the present disclosure.
Figure 7:
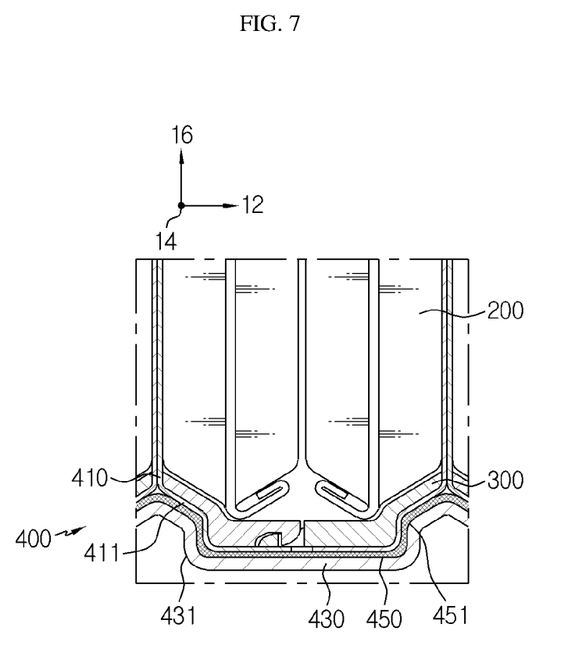
FIG. 7 is an enlarged view illustrating a region B of FIG. 6.

FIG. 6 is a cross-sectional view illustrating the battery module according to an embodiment of the present disclosure, and FIG. 7 is an enlarged view illustrating a region B of FIG. 6. Referring to FIGS. 6 to 7, the cooling unit 400 may cool the battery cells 100. The cooling unit 400 is in contact with the battery cells 100 and may cool the battery cells 100 in such a manner that heat from the battery cells 100 are sequentially transferred to a cooling fin 410, a connection member 450, and a cooling plate 430.

The cooling unit 400 includes the cooling fin 410, the cooling plate 430, and the connection member 450.

The cooling fin 410 transfers heat from a battery cell 100 to the connection member 450. The cooling fin 410 is in contact with a side of the battery cell 100. The cooling fin 410 and the battery cell 100 are in surface contact with each other. A plurality of cooling fins 410 are provided. The plurality of battery cells 100 and the plurality of cooling fins 410 are arranged in the first direction 12 in the order of a cooling fin 410, a battery cell 100, a battery cell 100, and a cooling fin 410, and arrangement in this order is repeated in the first direction 12. The cooling fins 410 may be formed of a metallic material. For example, the cooling fins 410 may be formed of an aluminum material. Alternatively, the cooling fins 410 may be formed of another metallic material having high thermal conductivity.

The cartridges 300 are placed on upper surfaces of the cooling fins 410 in the second direction 14. Surfaces of each of the cooling fins 410 may be in contact with the cartridges 300.

Each of the cooling fins 410 includes a bent fin portion 411. Herein, as shown in FIG. 6, the bent fin portion 411 is defined as the remaining portion of each of the cooling fins 410 except a vertical portion in the third direction 16 and a horizontal portion in the first direction 12, and the bent fin portion 411 has a shape bent toward a battery cell 100.

The bent fin portions 411 may be bent toward the battery cells 100. For example, the bent fin portions 411 may be bent in directions toward the battery cells 100 as shown in FIG. 7. The bent directions of the bent fin portions 411 are inclined downward in the third direction 16. Surfaces of the fin bent portions are in contact with the cartridges 300. The bent fin portions 411 are located under the cartridges 300 in the third direction 16. Portions of the cartridges 300 making contact with the bent fin portions 411 may have a shape corresponding to the bent fin portions 411.

The cooling plate 430 may transfer heat from the battery cells 100 to the outside or the heat exchange unit 500. The cooling plate 430 is placed under the cooling fins 410. The cooling plate 430 may make contact with the plurality of cooling fins 410 via the connection member 450 (described later). For example, the cooling plate 430 may be formed of an aluminum material. Alternatively, the cooling plate 430 may be formed of another metallic material having high thermal conductivity.

The cooling plate 430 includes a bent plate portion 431. Herein, as shown in FIG. 6, the bent plate portion 431 is defined as the remaining portion of the cooling plate 430 except a horizontal portion in the first direction 12, and the bent plate portion 431 has a shape extending from the horizontal portion of the cooling plate 430 and bent upward in the third direction 16.

The bent plate portion 431 is in contact with the bent fin portions 411. The bent direction of the bent plate portion 431 is inclined upward toward the third direction 16 from the horizontal portion of the cooling plate 430 in the first direction 12. A surface of the bent plate portion 431 is in contact with a bent connection portion 451 (described later). The other side of the bent plate portion 431 may be in contact with a heat exchange chamber 530 of the heat exchange unit 500 or may be exposed to the outside. The bent plate portion 431 is located under the bent fin portions 411 in the third direction 16. Bent plate portions 431 corresponding to the number of the bent fin portions 411 are provided.

Referring to FIG. 7, the number of the bent plate portions 431 corresponds to the number of the bent fin portions 411. Referring to the single cartridge 300 shown in FIG. 7 as a reference, one cartridge 300 includes two battery cells 100. Cooling fins 410 are placed on both sides of each of the battery cells 100 in the first direction 12. Each of the cooling fins 410 includes the bent fin portion 411 which is bent downward in the third direction 16. The bent plate portions 431 are respectively located under the bent fin portions 411 in the third direction 16. Portions of the cooling plate 430 located between the bent plate portions 431 have a flat shape as a whole. Referring to FIG. 7, the cooling plate 430 located below one cartridge 300 in the third direction 16 has a flat center portion and bent plate portions 431 on both sides in the first direction 12. In addition, the cartridge 300 located above the cooling plate 430 in the third direction 16 has the same structure and forms an accommodation space.

Lateral portions of battery cells 100 may be accommodated in the accommodation space. As shown in FIG. 7, the lateral portions of the battery cells 100 are portions protruding in the second direction 14 and becoming sharper in a triangular shape in a downward direction, and the lateral portions are accommodated in the accommodation space.

According to the above-described structure of the battery cells 100, the accommodation spaces of the cartridges 300 are also bent on both lateral sides thereof. In addition, the cooling fins 410 and the cooling plate 430 having shapes corresponding to the cartridges 300 have the same shape. Therefore, when the cooling fins 410 and the cooling plate 430 formed of metallic materials are brought into direct contact with each other and coupled to each other, gaps are inevitably formed between the cooling fins 410 and the cooling plate 430 because of the bent shapes thereof. However, the present disclosure solves this problem by providing the connection member 450 between the cooling fins 410 and the cooling plate 430.

The connection member 450 transfers heat from the cooling fins 410 to the cooling plate 430. The connection member 450 is placed between the cooling fins 410 and the cooling plate 430. A surface of the connection member 450 is in contact with the cooling fins 410, and the other surface of the connection member 450 is in contact with the cooling plate 430. The connection member 450 may be provided as a material having high thermal conductivity. For example, the connection member 450 may be provided as a thermal conductive sheet. In an embodiment, the connection member 450 may be provided as a thermal adhesive sheet. The thermal adhesive sheet has adhesiveness and thus may be brought into tight contact with surfaces of the cooling fins 410 and the cooling plate 430 as a whole. The thermal adhesive sheet may be a known sheet having high thermal conductivity. For example, the thermal adhesive sheet may be a known thermal bonding sheet having high thermal conductivity. The connection member 450 may be coupled to the cooling fins 410 and the cooling plate 430 by a thermal fusing method. The connection member 450 may be provided as a thermal adhesive sheet having a thin thickness, and surfaces of the connection member 450 making contact with the cooling fins 410 and the cooling plate 430 may be treated by a thermal fusing method such that any gap may not remain between the cooling fins 410 and the cooling plate 450. In addition, the connection member 450 may be provided as a material having high thermal conductivity and may transfer heat from the cooling fins 410 to the cooling plate 450.

The connection member 450 includes the bent connection portion 451. Herein, the bent connection portion 451 of the connection member 450 is defined as a portion having a bent shape and extending upward in the third direction 16 from a horizontal portion of the connection member 450 in the first direction 12.

The bent connection portion 451 is located between the bent fin portions 411 and the bent plate portions 431. The bent plate portions 431, the bent connection portion 451, the bent fin portions 411, and the cartridges 300 may be provided in a sequentially stacked manner in the third direction 16. The bent connection portion 451 has a shape bent downward in the third direction 16. The bent connection portion 451 may have a shape corresponding to the bent fin portions 411 and the bent plate portions 431. A plurality of bent connection portions 451 may be provided. The number of the bent connection portions 451 may correspond to the number of the bent fin portions 411 and the number of the bent plate portions 431.

Figure 8:
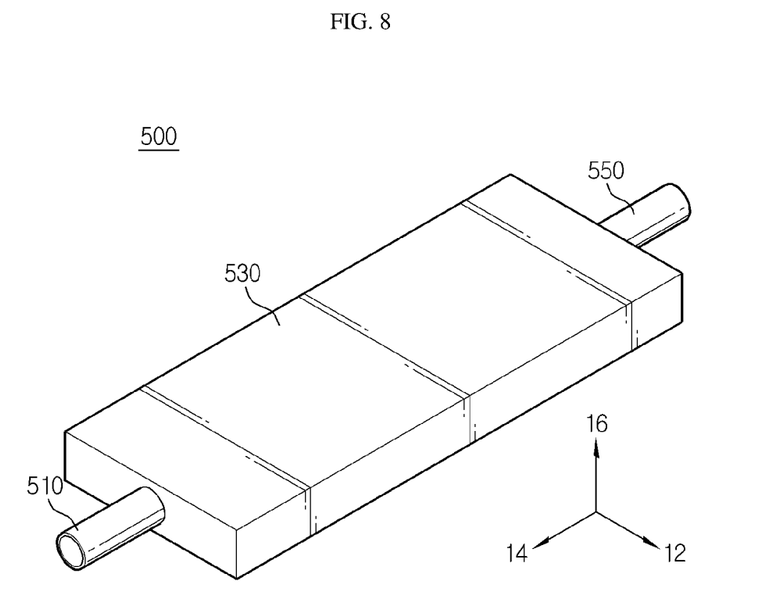
FIG. 8 is a perspective view illustrating a heat exchange unit of FIG. 3.

The heat exchange unit 500 may exchange heat with the cooling plate 430. The heat exchange unit 500 is placed below the cooling plate 430. The heat exchange unit 500 may exchange heat with the cooling plate 430 by using a cooling fluid contained therein. The heat exchange unit 500 may cool the cooling plate 430 by exchanging heat with the cooling plate 430. For example, the cooling fluid may be cooling water. Alternatively, the cooling fluid may be gas. For example, the gas may be air or helium gas.

The heat exchange unit 500 includes a supply pipe 510, the heat exchange chamber 530, and a discharge pipe 550. The supply pipe 510, the heat exchange chamber 530, and the discharge pipe 550 are arranged side by side in the second direction 14.

The supply pipe 510 receives the cooling fluid from outside and supplies the cooling fluid to the heat exchange chamber 530. The supply pipe 510 is coupled to a side of the heat exchange chamber 530. The supply pipe 510 may have a circular cross-sectional shape.

The heat exchange chamber 530 is placed below the cooling plate 430. The heat exchange chamber 530 has an inner space to contain the cooling fluid. The heat exchange unit 530 may cool the cooling plate 430 by using the cooling fluid contained therein. The heat exchange chamber 530 may have a rectangular parallelepiped shape as a whole. The heat exchange chamber 530 making contact with the cooling plate 430 may have a cross-sectional area equal to or greater than that of the cooling plate 430.

The discharge pipe 550 discharges the cooling fluid to the outside from the heat exchange chamber 530. The discharge pipe 550 is coupled to a side of the heat exchange chamber 530. The discharge pipe 550 may have a circular cross-sectional shape. Based on the heat exchange chamber 530, the discharge pipe 550 may be coupled to a side opposite the side to which the supply pipe 510 is coupled.

In the above-described example, the battery module 10 includes the heat exchange unit 500. Unlike this, the cooling plate 430 may be exposed to the outside. In this case, the cooling plate 430 may perform cooling by an air cooling method.

In the above-described example, one connection member 450 is provided between the cooling fins 410 and the cooling plate 430. However, a plurality of thermal conductive sheets may be provided between the cooling fins 410 and the cooling plate 430.

A battery pack of the present disclosure includes at least one such battery module 10 as described above. The battery pack may further include, in addition to the battery module 10, a case configured to accommodate the battery module 10 and other various devices configured to control charging and discharging operations of the battery module 10. For example, the battery pack may further include a battery management system (BMS), a current sensor, a fuse, or the like.

A battery pack including a plurality of battery modules 10 of the present disclosure may be applied to a vehicle such as an electric vehicle or a hybrid vehicle. A vehicle of the present disclosure may include a battery pack of the present disclosure, and the battery module 10 of the present disclosure may be included in the battery pack.

Hereinafter, effects of the present disclosure will be described. According to an embodiment of the present disclosure, the connection member 450 is provided between the cooling fins 410 and the cooling plate 430. Although the cooling fins 410 and the cooling plate 430 are brought into direct contact with each other, perfect surface-to-surface contact is not made because of bent shapes, and thus gaps are formed therebetween. The gaps decrease the efficiency of heat transfer from the cooling fins 410 to the cooling plate 430 and the efficiency cooling of the battery cells 100. However, according to the present disclosure, a thermal conductive sheet having high thermal conductivity may be provided to effectively transfer heat from the cooling fins 410 to the cooling plate 430. In addition, the thermal conductive sheet is coupled to the cooling fins 410 and the cooling plate 430 by a thermal fusing method. Therefore, any gap may not remain between the cooling fins 410, the thermal conductive sheet, and the cooling plate 430. Since gaps do not remain between the cooling fins 410, the thermal conductive sheet, and the cooling plate 430, heat of the battery cells 100 may be effectively transferred. In addition, the cooling efficiency of the battery cells 100 may be improved.

The foregoing detailed description illustrates examples of the present disclosure. In addition, the foregoing is intended to illustrate and explain preferred embodiments of the present disclosure, and the present disclosure may be used in various other combinations, modifications, and environments. That is, changes or corrections may be made within the scope of the inventive concept disclosed in the present specification, a range equivalent to the foregoing description, and/or the range of technology or knowledge of the related art. The foregoing embodiments are for illustrating the best mode for implementing the technical idea of the present disclosure, and various modifications may be made therein according to specific application fields and uses of the present disclosure. Therefore, the foregoing detailed description of the present disclosure is not intended to limit the inventive concept to the disclosed embodiments. It is also to be understood that the appended claims are intended to cover further embodiments.

What is claimed is:

1. A battery module comprising:
a cartridge comprising an accommodation space therein;
a plurality of battery cells disposed in the accommodation space; and
a cooling unit configured to cool the battery cells,
wherein the cooling unit comprises:
a cooling fin making surface contact with sides of the battery cells;
a cooling plate disposed below the cooling fin; and
a connection member disposed entirely between the cooling fin and the cooling plate and transferring heat from the cooling fin to the cooling plate, and
wherein:
a portion of the cooling fin making surface contact with the sides of the battery cells is in a vertical direction,
the cooling fin comprises a bent fin portion that is bent in a direction toward the battery cells to be diagonal relative to the vertical direction of the portion of the cooling fin making surface contact with the sides of the battery cells,
the cooling plate comprises a bent plate portion located below the bent fin portion, and
the connection member comprises a bent connection portion located between the bent fin portion and the bent plate portion.

2. The battery module of claim 1, wherein the connection member is a thermal conductive sheet.

3. The battery module of claim 1, wherein a surface of the bent fin portion is in contact with the cartridge.

4. The battery module of claim 1, wherein the bent fin portion, the bent plate portion, and the bent connection portion have shapes corresponding to each other.

5. The battery module of claim 4, wherein a portion of the cartridge making contact with the bent fin portion has a shape corresponding to the bent fin portion.

6. The battery module of claim 2, wherein the connection member is coupled to the cooling fin and the cooling plate by a thermal fusing method.

7. The battery module of claim 1, further comprising a heat exchange unit disposed below the cooling plate and capable of exchanging heat with the cooling plate.

8. The battery module of claim 7, wherein the heat exchange unit comprises:
a heat exchange chamber configured to exchange heat with the cooling plate by using a cooling fluid introduced from outside of the heat exchange chamber;
a supply pipe configured to supply the cooling fluid to the heat exchange chamber; and
a discharge pipe configured to discharge the cooling fluid outward from the heat exchange chamber.

9. A battery pack comprising the battery module of claim 1.

10. A vehicle comprising the battery pack of claim 9.

11. The battery module of claim 1, wherein there are two cooling fins between adjacent battery cells, each of the two cooling fins including a respective bent fin portion, the respective bent fin portions inclined away from each other to contact different cartridges.

\* \* \* \* \*